No. 841,881. PATENTED JAN. 22, 1907.
J. H. MONTIE.
PIPE COUPLING.
APPLICATION FILED OCT. 2, 1905.

Witnesses

Inventor
J. H. Montie

Attorneys

UNITED STATES PATENT OFFICE.

JOHN HERMAN MONTIE, OF TURTLE CREEK, PENNSYLVANIA.

PIPE-COUPLING.

No. 841,881.  Specification of Letters Patent.  Patented Jan. 22, 1907.

Application filed October 2, 1905. Serial No. 281,047.

*To all whom it may concern:*

Be it known that I, JOHN HERMAN MONTIE, a citizen of the United States, residing at Turtle Creek, in the county of Allegheny, State of Pennsylvania, have invented certain new and useful Improvements in Pipe-Couplings; and I do hereby declare the following to be a full, clear, and exact description of the invention, such as will enable others skilled in the art to which it appertains to make and use the same.

This invention relates to pipe-couplings.

One object is to provide an exceedingly simple, inexpensive, durable, and efficient coupling for the securing together of abutting ends of pipe-sections.

Another object resides in the provision of a pipe-coupling embodying such characteristics that it may readily couple the abutting ends of the adjacent pipe-sections together and also permit of the ready coupling thereof.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
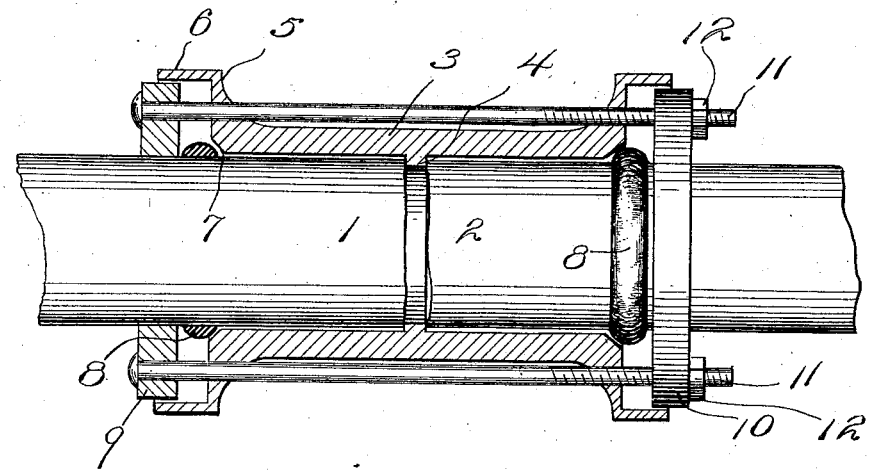
Figure 2:
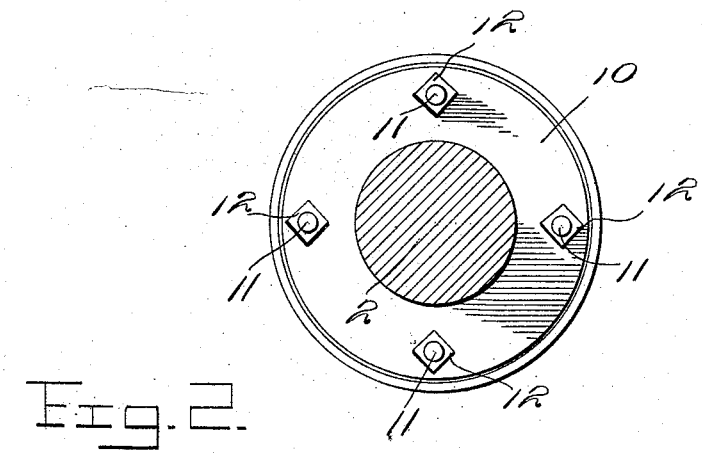

In the drawings, Figure 1 is a longitudinal sectional view of my invention. Fig. 2 is an end view.

Referring now more particularly to the accompanying drawings, the reference characters 1 and 2 designate the abutting ends of alining pipe-sections. In order to secure these pipe-sections together and prevent leakage at the joint of connection, I provide a suitable sleeve 3, provided interiorly intermediate its ends with an annular shoulder 4. The opposite ends of the sleeve 3 are directed outwardly, as at 5, and then forwardly, as at 6, the forwardly-directed portion 6 forming an annular flange at each end of the sleeve. It will be observed that the sleeve 3, at the base of the outwardly-directed portion 5, is beveled, as indicated by the reference character 7.

Disposed upon each pipe-section 1 and 2 is a washer or gasket 8, formed of rubber, leather, or any other suitable material and each of which is designed to present one of its peripheral edges to the beveled portion 7 at each end of the sleeve 3. In order to hold the gasket or washer 8 in the position just stated, I provide collars 9 and 10, adapted to embrace the pipe-sections 1 and 2, respectively, and then pass through the collars 9 and 10 and also through the outwardly-directed portions 5 at each end of the sleeve 3 a series of bolts 11. Each bolt has one end screw-threaded for working fit thereupon of a nut 12, adapted to bear against the outer face of the collar 10 to force the various elements of the coupling together, and thereby prevent leakage.

From the foregoing it will be seen that the adjacent ends of the alining pipe-sections do not contact with each other, but are spaced apart by reason of the aforesaid internal annular shoulder. Notwithstanding the fact of this space between the pipe-sections and the fact that the sleeve 3 fits loosely upon the pipe-sections there is no danger of leakage by reason of the clamping action between the collars 9 and 10, the washers or gaskets 8, and the sleeve 3.

What is claimed is—

In a pipe-coupling, the combination with a sleeve having outwardly-directed portions at its ends and annular flanges at the outer edges of said outwardly-directed portions and extending beyond the ends of the sleeve, said outwardly-directed portions having alining openings therein, of pipe-sections engaged within the sleeve, said sleeve having a shoulder therewithin for the reception of the ends of the pipe-sections thereagainst, said sleeve having its inner surface beveled outwardly at its ends, washers engaged with the pipe-sections for contact of the beveled surfaces, collars engaged with the pipe-sections and lying within the annular flanges of the sleeve, said collars having openings therein alining with the openings of the outwardly-directed portions of the sleeve, and bolts engaged in the alining openings and operable to draw the collars against the washers to clamp the latter against the beveled portions of the sleeve.

In testimony whereof I affix my signature in presence of two witnesses.

JOHN HERMAN MONTIE.

Witnesses:
 THOMAS M. FLUNG,
 LELAND WILLIAMS.